No. 719,466. PATENTED FEB. 3, 1903.
N. HISS.
TRACTION APPARATUS.
APPLICATION FILED MAR. 8, 1902.
NO MODEL. 2 SHEETS—SHEET 2.
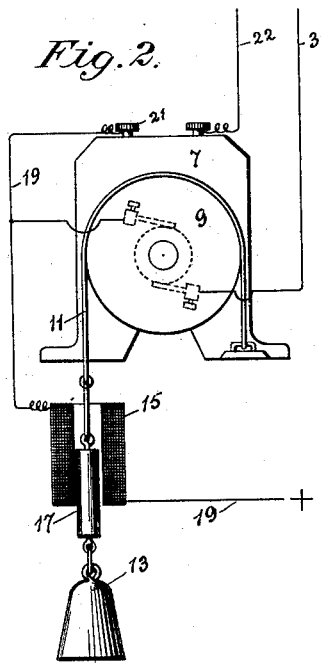
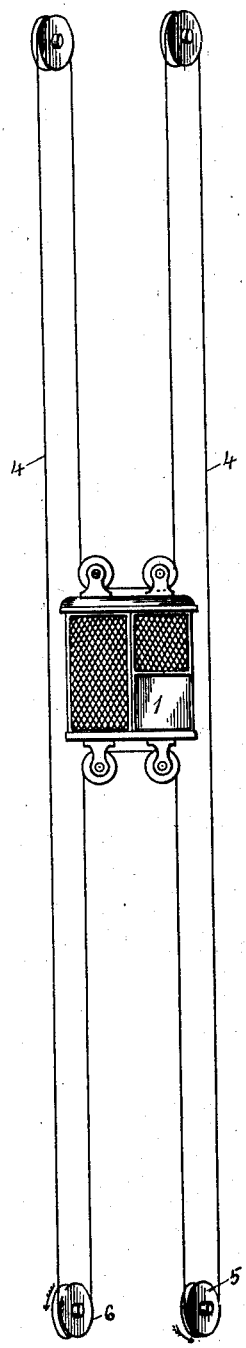
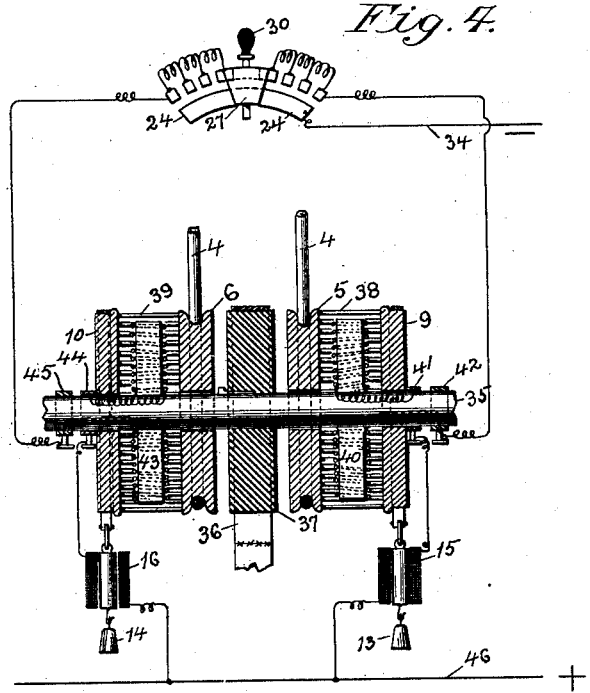

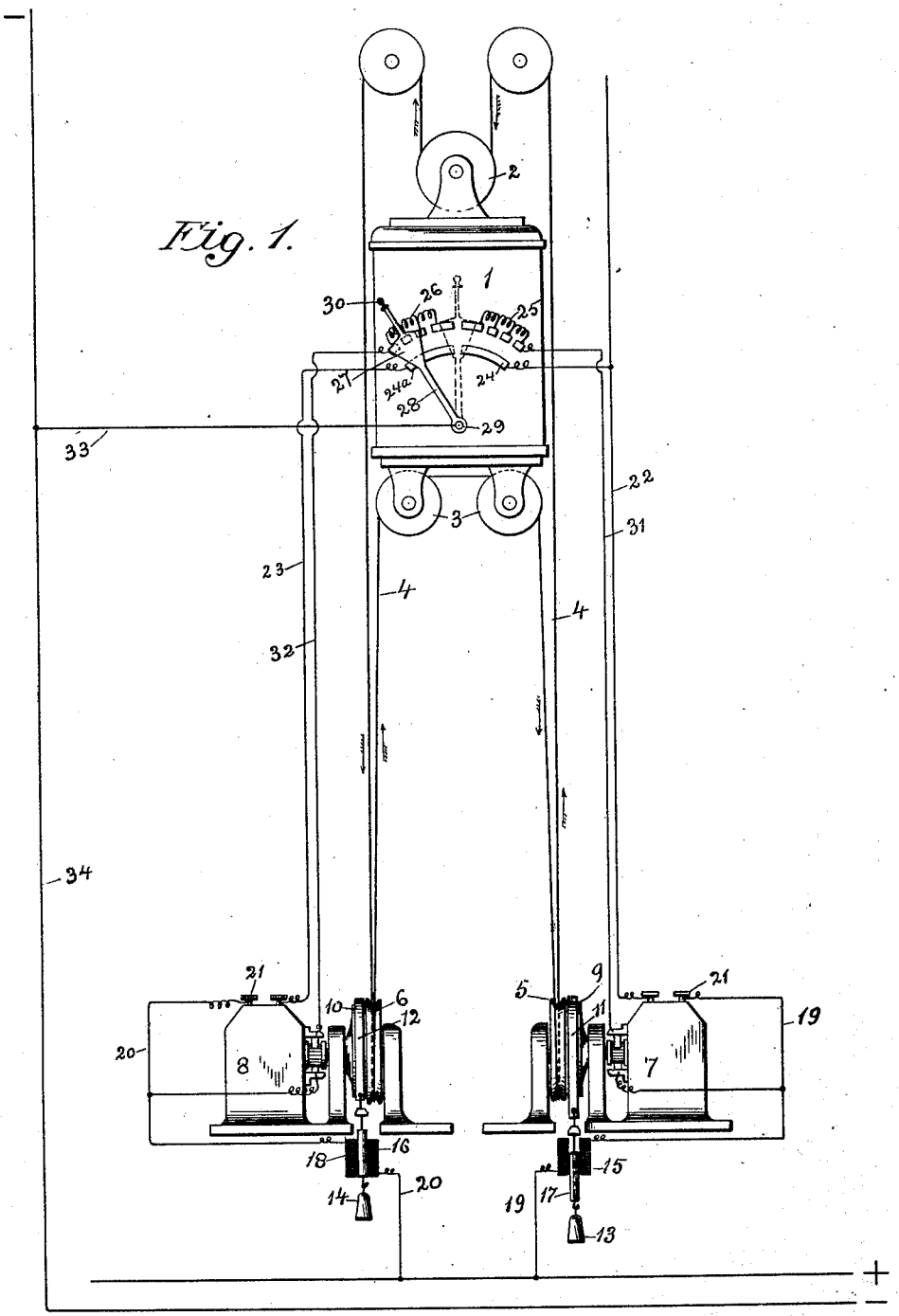

UNITED STATES PATENT OFFICE.

NELSON HISS, OF NEW YORK, N. Y.

TRACTION APPARATUS.

SPECIFICATION forming part of Letters Patent No. 719,466, dated February 3, 1903.

Application filed March 8, 1902. Serial No. 97,280. (No model.)

*To all whom it may concern:*

Be it known that I, NELSON HISS, a citizen of the United States, residing in the city, county, and State of New York, have invented a new and useful Improvement in Traction Apparatus, of which the following is a specification.

My present invention has reference to an improved means whereby elevators and other forms of traction apparatus may be operated by means of an endless cable formed in two bights, to each of which is applied a separate motive device, which motive devices may be separate prime movers or not, as desired, and whether such prime movers or not may be arranged either to run in the same or in opposite directions at will. My present device may also be arranged to operate with a constantly-moving cable or may operate with cables which are made to start and stop for various movements of the car.

Elevators have been hitherto driven by two separate electric motors acting upon an endless driving-cable, said cable moving constantly and the car being made to move one way or the other or to stand still by proper changes in the relative speeds of said motors. This entails excessively high speed of the cable for quick-service elevators, and operation is made dependent upon reactions within the motors for adjustments of relative speeds, which reactions are often unreliable. By the use of my invention two separate motors may be used, if desired, and a part at least of the endless cable may be kept moving at all times without entailing either of the difficulties above mentioned. The action of the motors is made positive, avoiding all delicate adjustments of relative speeds, and no part of the cable need ever move more than twice as fast as the car. At the same time my invention is perfectly adapted to traction apparatus driven by a single continuously-moving motor of any kind desired.

Certain preferred embodiments of my invention are illustrated as applied to elevators in the accompanying drawings, wherein—

Figure 1 shows in side view a car driven by an endless cable impelled by two separate electric motors controlled from the car. Fig. 2 is a side view of the motor and automatic brake preferably used with my elevator. Fig. 3 shows in diagram a modified arrangement of driving-pulleys and cable, and Fig. 4 shows in section the use of a single prime mover with two variable electric transmission means in my invention.

In Fig. 1 the car 1 is provided with a sheave 2 above it and with two equivalent sheaves 3 below it. The endless driving-cable 4 is impelled by the two separately-moving driving-pulleys 5 and 6, each of which is driven by its own electric motor 7 and 8, respectively. The arrangement of cable shown in this figure is appropriate to revolution of the pulleys 5 and 6 in opposite directions. When these pulleys move thus at equal speeds, the car will stand still and the cable 1 will run idle. On stopping the pulley 5 and holding it so the pulley 6 running, as indicated by the arrows, along the cable the car will ascend. On stopping the pulley 6 and allowing pulley 5 to run the car will descend. This is accomplished where two electric motors are used, as in Fig. 1, in the following manner, (see Figs. 1 and 2:) Each pulley 5 6 is provided with a brake-pulley 9 10, respectively, turning with it. Over each brake-pulley is a strap-brake 11 12 or its equivalent. The brake is applied normally by a weight 13 14 or its equivalent, and the pressure is removed by a solenoid 15 16, acting upon a core 17 18, acting upon said weight or its equivalent. The conductors 19 20, going to the field-magnet terminals 21 of the respective motors, are in series with the coils of the solenoids 15 16, as shown. The other terminals of the two field-magnets are connected by conductors 22 23 to the two-part switch-plate 24 24$^a$ in the controlling device. The specific controlling device shown in Fig. 1 comprises two rheostats 25 26, whose extreme terminals at their inner ends are brought near enough together so that the switch-plate 27 bridges from one to the other when in its middle position. This is indicated in dotted lines in the drawings. The plate 27 is carried by a lever 28, pivoted as at 29, and said plate rides always on the plates 24 24$^a$, but moves over the terminals of the two rheostats. The lever can be moved by the handle 30 or otherwise. The extreme outer terminal of the rheostat 25 is connected by wire 31 to one brush at the commutator of the motor 7, the other brush being connected to wire 19. The extreme outer terminal of the rheostat at 26 is connected by the wire 32 to one brush at the commutator of the motor 8, the other brush being connected to the wire 20. The lever 28 is in permanent connection with wire 33, leading to the return-main 34. In this form one or the other of the motors 7 8 (or both of them) is always running. With the handle in the position shown motor 7 is out of circuit and the weight 13 has applied the brake at 9 11, while motor 8 is running, with the effect of raising the car. Opposite movement of the handle 30 will produce the opposite effect. When the handle is in the middle position, the cable will run idle and the two motors 7 8 will run at equal speeds in opposite directions.

It is obvious that the above ends can be attained by use of a variety of forms of controller on or off of the car, and I am not to be limited to the form above described or its strict equivalent. It is also clear that my apparatus as above described and as described below can be operated by stopping both motors when the car is to stand still, if desired, and my invention is broad enough to cover this mode of operation and such controllers as will carry it out. The direction in which the driving-pulleys run with relation the one to the other is merely a question of arrangement of the driving-cable, and whether one or more prime movers are used the pulleys may be run either in the same or in contrary directions, as desired, without departing from my invention. In the arrangement shown in diagram in Fig. 3, for instance, the two driving-pulleys 5 6 run in the same direction and may be driven by a common prime mover if arranged to stop one or the other at will. This may be accomplished by various means; but a preferred device for this purpose is shown in Fig. 4 in section. Here the main shaft 35 is run by the belt 36 and pulley 37, while the driving-pulleys 5 6 and brake-disks 9 10 turn loosely on said shaft. The pulley 5 has rigidly attached and turning with it the squirrel-cage inductive armature 38, and a like armature 39 is attached in like manner to the pulley 6. Within the armature 38 magnetic poles 40 are attached rigidly to the main shaft and revolve with it, and these poles are wound with proper windings of wires, which are brought out at the collector-brushes 41 42, whereby they may be brought into an appropriate circuit. Similar posts 43 are fixed within the armature 39, and their windings are brought out to similar collector-rings 44 45 for a like purpose.

In Fig. 4 the wires 34 and 46 represent properly-connected electric mains, and it will be obvious that in the position shown of the plate 27 of the controller the resistance in the circuits of the two sets of poles 40 and 43 will be equal and that there will be a tendency in these poles to exert an equal dragging effect, as well understood, upon their respective squirrel-cage armatures, thus driving both pulleys at once and causing idle movement of the cable, the elevator-car standing still. Upon throwing the plate 27 one way or the other one or the other of the motive devices 5 6 will be held stationary by the application of its appropriate brake, while the other will act with increased force upon the cable to move the car one way or the other.

It is obvious that various forms of controller may be used with motive devices of the form shown in Fig. 4 and also that these devices can be modified greatly, both as to form and as to combination with one or more motors, without departing from my invention.

A variety of modifications may be made in the apparatus herein shown and described without departing from the spirit of my invention, and I am not to be understood as limiting myself to the details of the apparatus herein shown and described.

What I claim is—

1. In traction apparatus, an endless driving-cable in two bights, motive means in each bight of said cable, driving means for said motive devices and means for holding either of said motive means and its corresponding bight of cable stationary at will.

2. In traction apparatus, an endless driving-cable in two bights, motive means for each of said bights of said cable, a common prime mover for said two motive devices and means for holding either of said motive means stationary at will.

3. In traction apparatus, an endless driving-cable in two bights, means for holding one of said bights stationary and means for imparting motion to the other bight.

4. In traction apparatus, an endless driving-cable in two bights, means for holding either of said bights stationary at will and means for imparting motion to either of said bights of cable at will.

5. In traction apparatus, an endless driving-cable in two bights, electromagnetic means for imparting motion to each bight of cable and means for holding either of said bights stationary at will; in combination with a controlling means adapted to start one of said electromagnetic means alone while operating the holding means on the opposite bight of cable.

6. In traction apparatus, an endless driving-cable in two bights, electromagnetic means for imparting motion to each bight of cable, means for holding either of said bights stationary at will and electromagnetic means in circuit with each motion-imparting means for making inoperative its appropriate holding means; in combination with a controller for closing electric circuit through the electromagnetic means on one or the other bight of cable at will.

7. In traction apparatus, an endless driving-cable in two bights, two driving-pulleys for said two bights respectively, an electromagnetic clutch for each driving-pulley and a common driving-shaft attached to one side of each of said electromagnetic clutches; in combination with a brake for each pulley, electromagnetic means in circuit with each clutch for releasing said brakes respectively and a controller adapted to close circuit through one or the other of said clutches and its appropriate brake-releasing means.

8. In traction apparatus, an endless driving-cable in two bights, a motive device for each bight, a holding means for each bight and means for driving both of said motive means on the one hand or stopping either and operating its appropriate holding means on the other hand for stopping and starting the traction apparatus.

NELSON HISS.

Witnesses:
CHAS. F. HALSTED,
HAROLD S. MACKAYE.